US009635496B2

(12) United States Patent
Terazaki et al.

(10) Patent No.: US 9,635,496 B2
(45) Date of Patent: Apr. 25, 2017

(54) RADIO COMMUNICATION APPARATUS, COMPUTER READABLE MEDIUM, PERIPHERAL, AND CENTRAL

(71) Applicant: Casio Computer Co., Ltd., Shibuya-ku (JP)

(72) Inventors: Tsutomu Terazaki, Shibuya-ku (JP); Takahiro Tomida, Shibuya-ku (JP); Ryo Okumura, Shibuya-ku (JP); Toshihiro Takahashi, Shibuya-ku (JP)

(73) Assignee: Casio Computer Co., Ltd., Tokyo (JP)

( * ) Notice: Subject to any disclaimer, the term of this patent is extended or adjusted under 35 U.S.C. 154(b) by 94 days.

(21) Appl. No.: 14/641,010

(22) Filed: Mar. 6, 2015

(65) Prior Publication Data

US 2015/0256968 A1 Sep. 10, 2015

(30) Foreign Application Priority Data

Mar. 6, 2014 (JP) .................................. 2014-043554

(51) Int. Cl.
| | |
|---|---|
| *H04B 7/00* | (2006.01) |
| *H04W 4/00* | (2009.01) |
| *H04W 4/20* | (2009.01) |
| *H04W 76/02* | (2009.01) |
| *H04W 8/00* | (2009.01) |
| *G06F 13/10* | (2006.01) |
| *H04W 48/12* | (2009.01) |
| *G06Q 10/00* | (2012.01) |

(52) U.S. Cl.
CPC .......... *H04W 4/008* (2013.01); *G06F 13/102* (2013.01); *G06Q 10/00* (2013.01); *H04W 4/206* (2013.01); *H04W 8/005* (2013.01); *H04W 48/12* (2013.01); *H04W 76/02* (2013.01)

(58) Field of Classification Search
CPC ..... H04W 48/12; H04W 4/008; H04W 4/206; H04W 76/02; H04W 8/005
USPC ................................................ 455/41.1, 41.2
See application file for complete search history.

(56) References Cited

U.S. PATENT DOCUMENTS

| | | | |
|---|---|---|---|
| 7,043,751 B1 * | 5/2006 | Fischer ............... | H04M 3/4228 726/4 |
| 2002/0077139 A1 * | 6/2002 | Bouet ....................... | H04L 1/08 455/522 |
| 2006/0039314 A1 * | 2/2006 | Narayanan .............. | H04L 45/02 370/328 |
| 2008/0055113 A1 * | 3/2008 | Muro ..................... | G06Q 10/00 340/870.16 |

(Continued)

FOREIGN PATENT DOCUMENTS

JP 2012-142877 7/2012

*Primary Examiner* — Wesley Kim
*Assistant Examiner* — Raj Chakraborty
(74) *Attorney, Agent, or Firm* — Cozen O'Connor

(57) ABSTRACT

A peripheral transmits an advertisement including an order of connection priority of when a central is connected to the own apparatus. The central receives the advertisement. The central acquires the order of connection priority included in the received advertisement. The central controls transmission of a connection request signal to the peripheral based on the acquired order of connection priority. In response to the transmitted advertisement, the peripheral receives a connection request signal transmitted from the central. According to the connection request signal, the peripheral establishes connection with the central.

5 Claims, 14 Drawing Sheets

(56) References Cited

U.S. PATENT DOCUMENTS

2012/0218089 A1* 8/2012 Hill .................. G06F 3/016
   340/407.1
2015/0156808 A1* 6/2015 Brantner ............ H04W 76/025
   455/41.2

* cited by examiner

FIG. 8

| CENTRAL | ADDRESS | TRANSMISSION CONDITION | PRIORITY |
|---|---|---|---|
| 100a | Address 100a | TEMPERATURE OF 25°C OR HIGHER | HIGH |
| 100b | Address 100b | WBGT VALUE OF ALERT OR HIGHER | MIDDLE |
| 100c | Address 100c | HUMIDITY OF 60% OR HIGHER | LOW |

FIG. 10

| EXAMPLE | ADVERTISEMENT |
|---|---|
| 1 | AD Data = 0x00 [Adress 100a] |
| 2 | AD Data = 0x00 [Adress 100a] 0x01 [Adress 100b] |
| 3 | AD Data = 0x00 [Adress 100a] 0x01 [Adress 100b] 0x02 [Adress 100c] |

FIG. 13

| CENTRAL | ADDRESS | TRANSMISSION CONDITION | PRIORITY |
|---|---|---|---|
| 100a | Address 100a | TEMPERATURE OF 25°C OR HIGHER | HIGH |
| 100b | Address 100b | WBGT VALUE OF ALERT OR HIGHER | MIDDLE |
| 100c | Address 100c | HUMIDITY OF 60% OR HIGHER | LOW |
| 100d | Address 100d | TEMPERATURE OF 25°C OR HIGHER | MIDDLE |

FIG. 14

| EXAMPLE | ADVERTISEMENT |
|---|---|
| 1 | AD Data = 0x00 [Adress 100a] |
| 2 | AD Data = 0x00 [Adress 100b] 0x01 [Adress 100a] |
| 3 | AD Data = 0x00 [Adress 100b] 0x01 [Adress 100a] 0x02 [Adress 100c] |
| 4 | AD Data = 0x00 [Adress 100b] 0x01 [Adress 100a] 0x01 [Adress 100d] 0x02 [Adress 100c] |

RADIO COMMUNICATION APPARATUS, COMPUTER READABLE MEDIUM, PERIPHERAL, AND CENTRAL

BACKGROUND

1. Technical Field

The present invention relates to a radio communication apparatus, a computer-readable medium, a peripheral, and a central.

2. Related Art

Recently, Bluetooth (registered trademark) low energy (hereinafter, referred to as BLE) which is a near field radio communication standard in which power consumption is controlled. Radio communication which is based on the BLE is performed between a peripheral which is a radio communication device to provide a service and a central which is a radio communication device which uses the service.

More specifically, first, a peripheral intermittently transmits announcement information which is called an advertisement and which is for signaling an outline of an own service or existence of the self. Next, when receiving the advertisement, a central transmits a connection request signal to the peripheral. Then, when receiving the connection request signal, the peripheral transmits data related to the service to the central (see, for example, JP 2012-142877 A).

SUMMARY

Incidentally, by including identification information (such as ID or address) of a central to be a connection object in an advertisement, the peripheral can transmit/receive data to/from a specified central. In this case, by including a plurality of pieces of identification information, the peripheral can transmit/receive data to/from a plurality of specific centrals.

However, in a case where the peripheral transmits an advertisement including a plurality of pieces of identification information, even when there is an order of priority in a central to be a connection object, a connection request signal may not be received in the order of priority. Also, in this case, connection request signals may be transmitted simultaneously from a plurality of specific centrals and interference of the plurality of connection request signals may occur.

Also, a method to transmit, for the predetermined number of times, an advertisement only including identification information of a central to be a first connection object of a peripheral and to serially transmit, for the predetermined number of times, advertisements only and respectively including a central to be a second connection object and that to be a third connection object in an order of priority can also be considered. However, a waiting time in a subsequent central becomes long and efficiency is low.

Thus, the present invention has been made in view of the forgoing and to provide a radio communication apparatus and the like which makes it possible to perform radio communication efficiently while preventing interference. A radio communication apparatus includes: a communication unit configured to: transmit announcement information including an order of connection priority of when a different radio communication apparatus is connected to an own apparatus; and receive a connection request signal transmitted from the different radio communication apparatus according to the announcement information; and a control unit configured to establish connection with the different radio communication apparatus according to the connection request signal received by the communication unit.

According to the present invention, it is possible to perform radio communication efficiently while preventing interference.

BRIEF DESCRIPTION OF THE DRAWINGS

FIG. 8 is a view illustrating an example of a transmission condition table;

FIG. 10 is a view illustrating an example of an advertisement transmitted by the advertisement transmission processing;

FIG. 13 is a view illustrating a different example of a transmission condition table;

FIG. 14 is a view illustrating a different example of an advertisement transmitted by the advertisement transmission processing.

DETAILED DESCRIPTION

Figure 1:
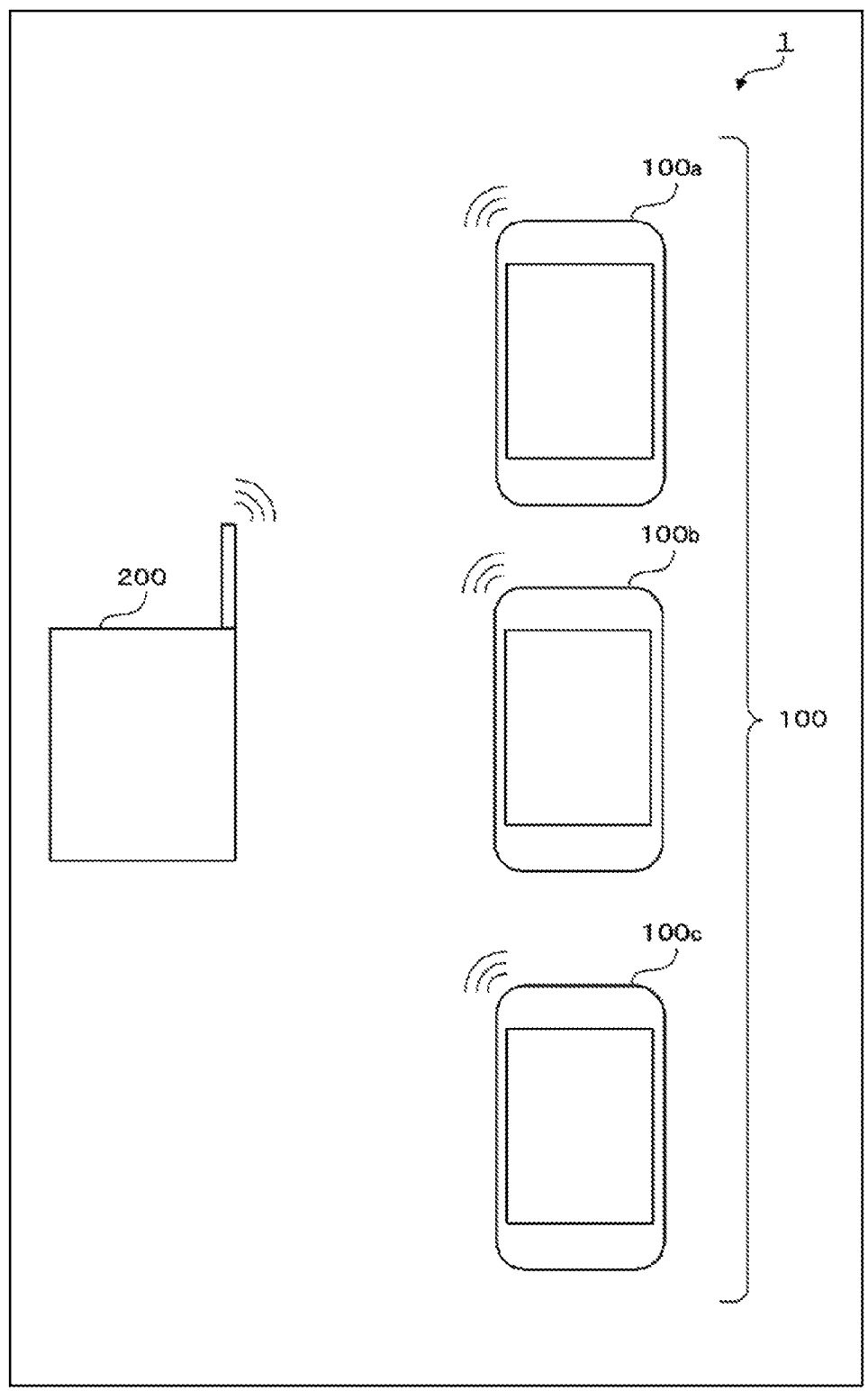
FIG. 1 is a view illustrating a configuration example of a radio communication system according to an embodiment.

In the following, an embodiment of the present invention will be described with reference to the drawings. FIG. 1 is a view illustrating a configuration example of a radio communication system according to the embodiment of the present invention. In the configuration example illustrated in FIG. 1, a radio communication system 1 includes a peripheral 200 which is a radio communication apparatus and a central 100 which is a radio communication apparatus different from the peripheral 200.

Based on BLE, the peripheral 200 and the central 100 perform radio communication with each other. The BLE is a standard (mode) designed for low power consumption in a near field radio communication standard called the Bluetooth (registered trademark). Here, the central 100 uses a service (such as measured data) provided by the peripheral 200. On the other hand, the peripheral 200 provides a service to the central 100.

In the present embodiment, the peripheral 200 provides measured predetermined data as a service. More specifically, the peripheral 200 is installed at a place, where temperature and humidity are to be measured, such as a factory, a construction site, a gymnasium, or an athletic field. The peripheral 200 measures a temperature and humidity of an installation place and calculates a wet bulb globe temperature (WBGT) value from the measurement value. Then, the peripheral 200 transmits data such as a temperature, humidity, and a WBGT value to the central 100. Note that the WBGT value is an index value indicating, for example, a degree of tendency of heatstroke got by a worker in a working environment.

On the other hand, the central 100 is a portable terminal such as a mobile phone, a smartphone, a tablet-type personal computer, or a notebook-type personal computer and includes a radio communication function which is based on the BLE. In the present embodiment, for example, the central 100 includes a smartphone. Note that in the present embodiment, when it is not necessary to distinguish centrals 100a to 100c from each other, the centrals 100a to 100c are integrally referred to as a central 100 in the following description.

Figure 2:
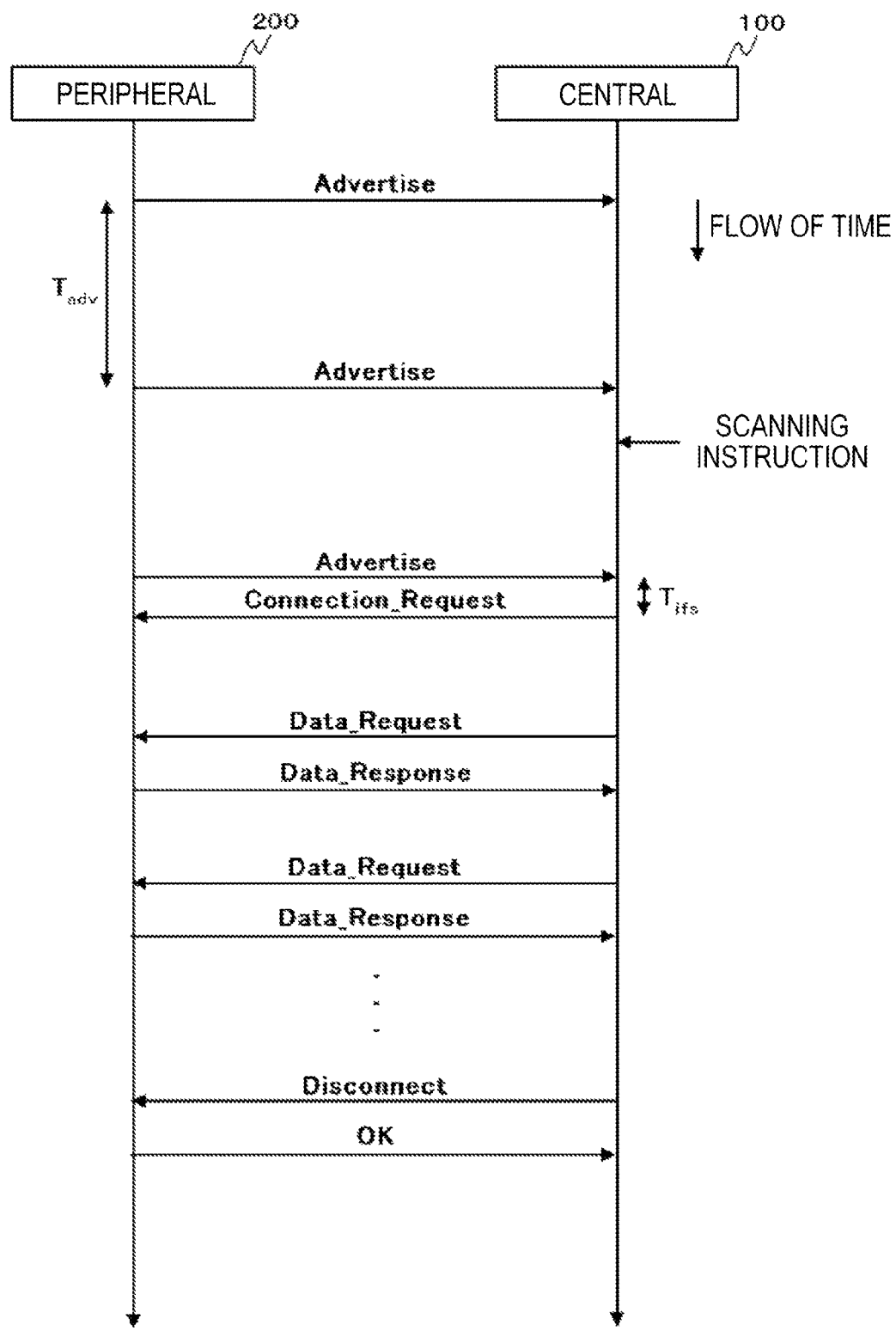
FIG. 2 is a view illustrating sequence of radio communication which is based on a standard of BLE.

Here, radio communication which is based on a standard of the BLE will be described with reference to FIG. 2. FIG. 2 is a view illustrating sequence of the radio communication. First, the peripheral 200 transmits an advertisement in each Tadv at certain intervals. The advertisement is announcement information for signaling an outline of an own service or existence of the self.

Next, the central 100 receives the advertisement. When there is a scanning instruction which is based on user operation or the like, the central 100 transmits a connection request signal after Tifs (such as 150 μsec) from an advertisement received after the scanning instruction.

Next, when receiving a connection request signal, the peripheral 200 establishes connection with the central 100 and performs transmission/reception of data requested by the central 100. After the transmission/reception of the data, disconnection is performed and the radio communication ends.

Figure 3:
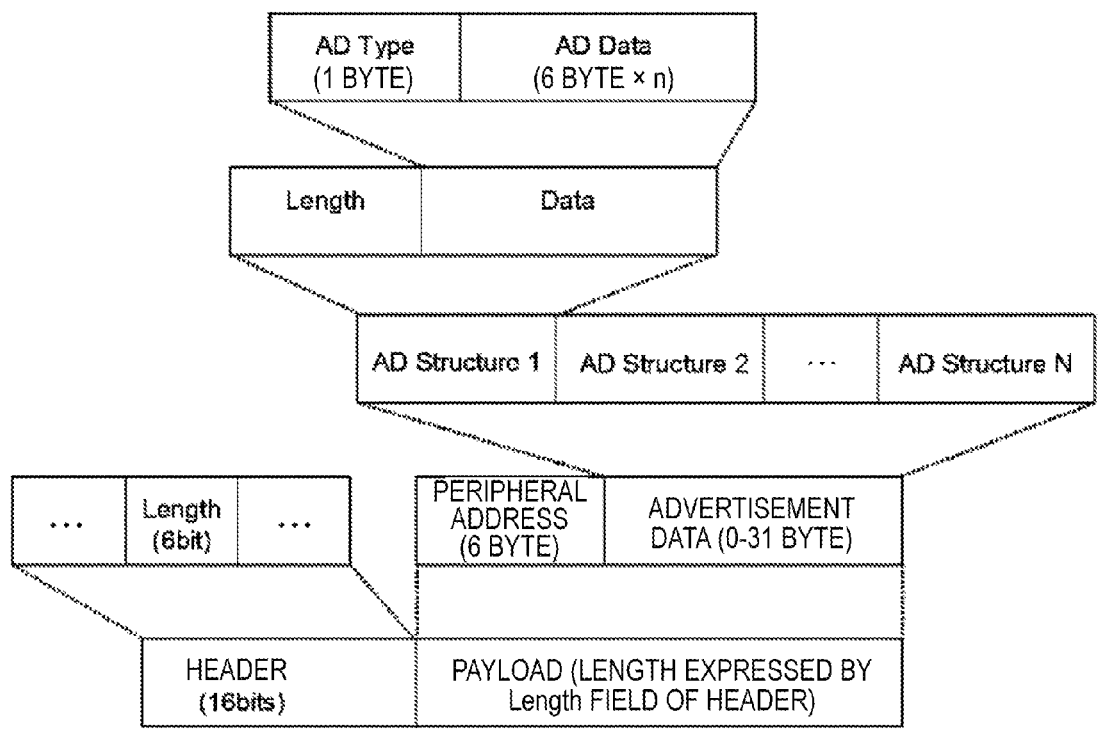
FIG. 3 is a view illustrating a packet of an advertisement which is based on the standard of the BLE.

Here, a packet of the advertisement transmitted by the peripheral 200 in the radio communication in FIG. 2 will be described with reference to FIG. 3. FIG. 3 is a view illustrating a packet of the advertisement which is based on the standard of the BLE.

An AD Type indicates a kind of AD Data. When a specific central 100 is a connection object, the peripheral 200 specifies, as the AD Type, either a Public Target Address (one byte) or a Random Target Address (one byte). Then, the peripheral 200 specifies an address (six byte) of the specific central 100 in the AD Data. The peripheral 200 can also specify addresses (six byte×n) of a plurality of specific centrals 100 in the AD Data. Accordingly, connection request signals connection objects of which are a great number of unspecific centrals 100, that is, connection request signals from the great number of unspecific centrals 100 are prevented from being received.

Note that it is determined by the peripheral 200 whether to specify the Public Target Address or the Random Target Address according to an address of a central 100 to be a connection object being a unique address of a device or an address generated randomly.

Referring back to FIG. 3, a Length indicates a length of Data including the AD Type and the AD Data. Advertisement data includes a plurality of AD Structures, each of which includes the Length and the Data, and has 31 bytes at a maximum. Here, when a plurality of centrals 100 to be connection objects respectively including the Public Target Address and the Random Target Address is mixed, for example, in an AD Structure 1, addresses of a plurality of centrals 100 are included while the Public Target Address is specified and in an AD Structure 2, addresses of a plurality of centrals 100 are included while the Random Target Address is specified.

Next, a payload is the number of bites of a length, which is indicated by the Length, in a header and includes a peripheral address and advertisement data.

The above is the packet of the advertisement which is based on the standard of the BLE. In the radio communication which is based on the standard described with reference to FIG. 2 and FIG. 3, it is possible to perform radio communication with a plurality of specific centrals but it is not possible to perform radio communication in which interference of connection request signals or an order of priority in the plurality of specific centrals is considered. Thus, in the present embodiment, the peripheral 200 transmits an advertisement including an order of connection priority. In the following, the peripheral 200 according to the present embodiment will be described.

Figure 4:
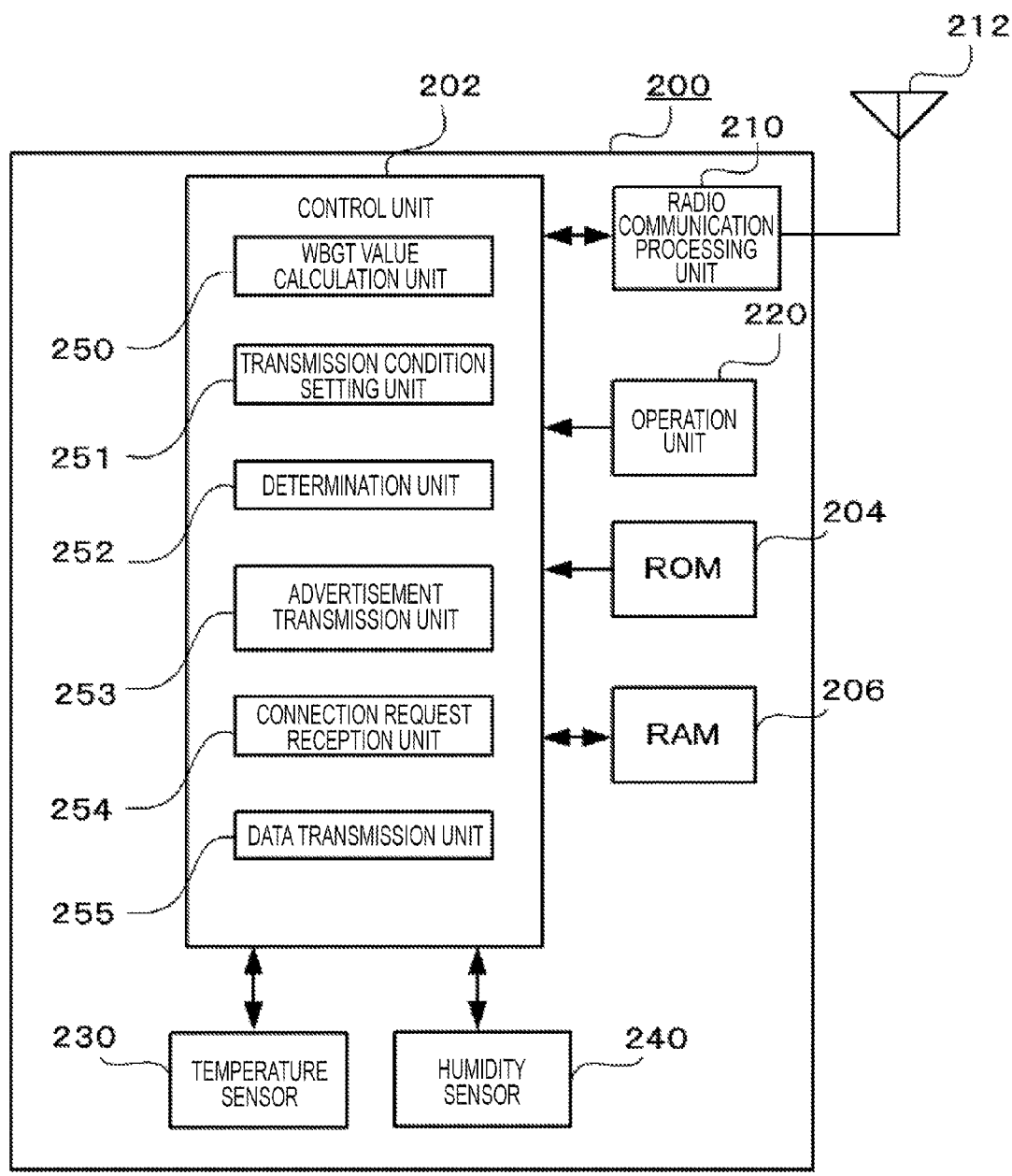
FIG. 4 is a block diagram illustrating a configuration example of a peripheral according to the embodiment.

FIG. 4 is a block diagram illustrating a configuration example of the peripheral 200 according to the present embodiment. As illustrated in FIG. 4, the peripheral 200 includes a control unit 202, a read only memory (ROM) 204, a random access memory (RAM) 206, a radio communication processing unit 210, an antenna 212, an operation unit 220, a temperature sensor 230, and a humidity sensor 240.

The control unit 202 includes, for example, a central processing unit (CPU). The control unit 202 controls various functions included in the peripheral 200 by executing software processing according to a program (such as program to realize transmission condition setting processing, advertisement transmission processing, or the like described later) stored in the ROM 204.

The ROM 204 includes a non-volatile memory such as a flash memory. As described above, the ROM 204 stores a program or data for controlling various functions, the controlling being performed by the control unit 202. The RAM 206 includes a volatile memory and is used as a work area to temporarily store data for performance of various kinds of processing by the control unit 202.

The radio communication processing unit 210 includes, for example, a radio frequency (RF) circuit or a baseband (BB) circuit. The radio communication processing unit 210 performs transmission and reception of a radio signal based on the BLE through the antenna 212.

The operation unit 220 includes, for example, a switch and is used for input of contents of operation performed by a user such as turning on/off of a power.

The temperature sensor 230 includes, for example, a resistance temperature detector or a thermocouple. The temperature sensor 230 measures a temperature around the peripheral 200, that is, a temperature of a place where the peripheral 200 is installed and transmits data indicating the measurement result to the control unit 202.

The humidity sensor 240 includes, for example, a polymer membrane. The humidity sensor 240 measures humidity around the peripheral 200, that is, humidity of a place where the peripheral 200 is installed and transmits data indicating the measurement result to the control unit 202.

Next, a functional configuration of the control unit 202 of the peripheral 200 will be described. As illustrated in FIG. 4, the control unit 202 functions as a WBGT value calculation unit 250, a transmission condition setting unit 251, a determination unit 252, an advertisement transmission unit 253, a connection request reception unit 254, and a data transmission unit 255.

Figure 5:
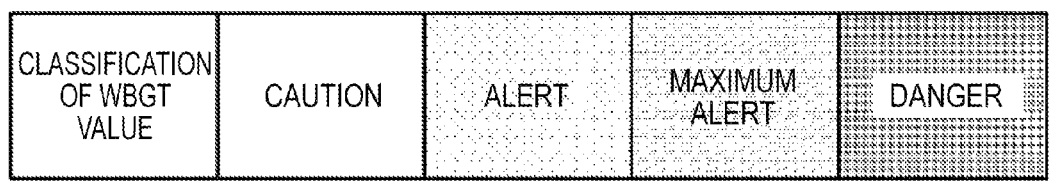
FIG. 5 is a view illustrating classification of a WBGT value.

The WBGT value calculation unit 250 calculates a WBGT value, which is a heatstroke index, based on the data of a temperature and humidity acquired respectively from the temperature sensor 230 and the humidity sensor 240. The higher the WBGT value is, the more a person tends to get a heatstroke. For example, as illustrated in FIG. 5, according to a degree of tendency of getting a heatstroke, classification into four categories which are a caution, an alert, a maximum alert, and danger is performed.

The transmission condition setting unit 251 receives a transmission condition of predetermined data transmitted from the central 100 and sets and stores the received transmission condition. More specifically, the transmission condition setting unit 251 receives, from the central 100, a transmission condition (such as temperature being 25° C. or higher) of measurement data such as a temperature, humidity, or a WBGT value. Next, the transmission condition setting unit 251 sets and stores the received transmission condition into the ROM 204. Note that the transmission condition setting unit 251 corresponds to transmission condition reception means.

The determination unit 252 determines whether the transmission condition received by the transmission condition setting unit 251 is satisfied. More specifically, the determination unit 252 determines whether a transmission condition (such as temperature being 25° C. or higher) of measurement data of a temperature, humidity, a WBGT value, or the like is satisfied. Note that the determination unit 252 corresponds to determination means.

When the determination unit 252 determines that the transmission condition is satisfied, the advertisement transmission unit 253 starts transmitting an advertisement including an address of a central 100 which has transmitted the transmission condition and an order of connection priority of when the central 100 is connected to the own apparatus. Note that the advertisement transmission unit 253 corresponds to announcement information transmission means.

According to the advertisement transmitted from the advertisement transmission unit 253, the connection request reception unit 254 receives a connection request signal transmitted from the central 100. Also, according to the received connection request signal, the connection request reception unit 254 establishes connection with the central 100. Note that the connection request reception unit 254 corresponds to signal reception means and connection establishment means. After the connection with the central 100 is established, the data transmission unit 255 transmits, to the central 100, measurement data which satisfies the transmission condition.

Figure 6:
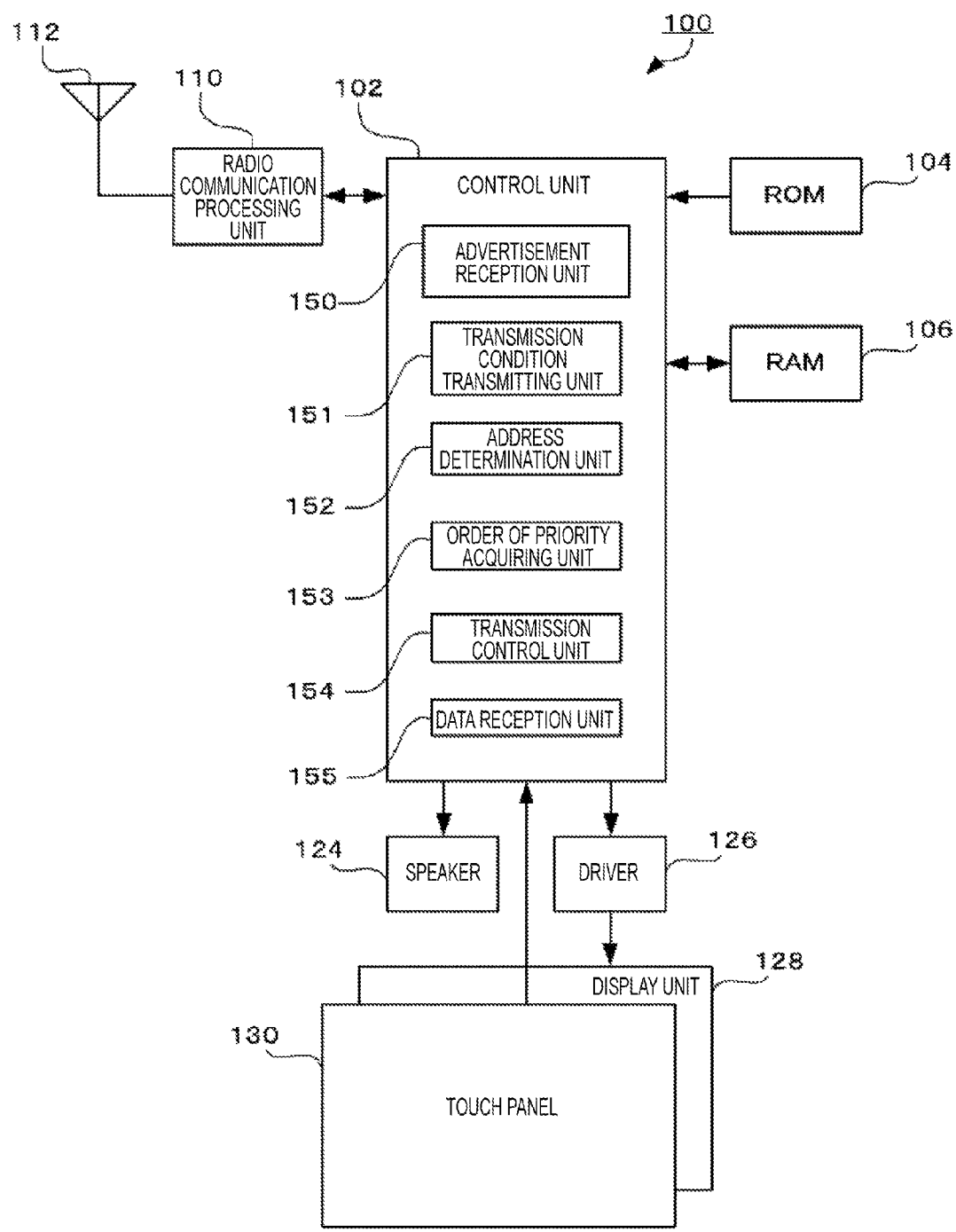
FIG. 6 is a block diagram illustrating a configuration example of a central according to the embodiment.

Next, a configuration of the central 100 according to the embodiment will be described with reference to FIG. 6. FIG. 6 is a block diagram illustrating a configuration example of the central 100. As illustrated in FIG. 6, the central 100 includes a control unit 102, a ROM 104, a RAM 106, a radio communication processing unit 110, an antenna 112, a speaker 124, a driver 126, a display unit 128, and a touch panel 130.

The control unit 102 includes, for example, a CPU. The control unit 102 controls various functions included in the central 100 by executing software processing according to a program (such as program to realize advertisement reception processing described later) stored in the ROM 104.

The ROM 104 includes, for example, a non-volatile memory such as a flash memory. As described above, the ROM 104 stores a program or data for controlling various functions, the controlling being performed by the control unit 102. The RAM 106 includes a volatile memory and is used as a work area to temporarily store data for performance of various kinds of processing by the control unit 102.

The radio communication processing unit 110 includes, for example, a radio frequency circuit or a baseband circuit. The radio communication processing unit 110 performs transmission and reception of a radio signal based on the BLE through the antenna 112.

Based on sound data from the control unit 102, the speaker 124 outputs sound such as an alarm. The driver 126 outputs, to the display unit 128, an image signal which is based on image data output from the control unit 102. The display unit 128 includes, for example, a liquid crystal display (LCD) or an electroluminescence (EL) display. The display unit 128 displays an image (such as image of "alert" in WBGT value) according to the image signal output from the driver 126.

The touch panel 130 is an interface arranged on an upper surface of the display unit 128 and used for input of contents of operation performed by a user. In the touch panel 130, for example, a transparent electrode (not illustrated) is embedded. When a finger of a user or the like is in contact, the touch panel 130 detects a position where voltage varies as a contact position and outputs, to the control unit 102, information of the contact position as an input instruction.

Next, a functional configuration of the control unit 102 of the central 100 will be described. As illustrated in FIG. 6, the control unit 102 functions as an advertisement reception unit 150, a transmission condition transmitting unit 151, an address determination unit 152, an order of priority acquiring unit 153, a transmission control unit 154, and a data reception unit 155.

When there is a scanning instruction by user operation or the like, the advertisement reception unit 150 receives an advertisement. More specifically, after the scanning instruction is given, the advertisement reception unit 150 scans a channel in a frequency band, where a packet of the advertisement is transmitted, and receives the advertisement. Note that as the user operation for the scanning instruction, for example, activation of an application to use a provided service of measurement data provided by the peripheral 200 can be considered. Also, the scanning instruction is not necessarily given by user operation and may be given automatically in a predetermined period of time after activation of an application.

The transmission condition transmitting unit 151 transmits a transmission condition of predetermined data to the peripheral 200. More specifically, after receiving the advertisement from the peripheral 200, the transmission condition transmitting unit 151 transmits a transmission condition (such as temperature being 25° C. or higher) of measurement data to the peripheral 200. Note that the advertisement transmitted by the peripheral 200 to receive a transmission condition does not include an order of connection priority. Also, the transmission condition transmitting unit 151 corresponds to transmission means.

The address determination unit 152 determines whether an address of the own apparatus is included in an advertisement including an order of connection priority and transmitted by the peripheral 200 after the transmission condition is satisfied. When it is determined by the address determination unit 152 that the address of the own apparatus is included in the advertisement, the order of priority acquiring unit 153 acquires the order of connection priority included in the advertisement. Note that the order of priority acquiring unit 153 corresponds to acquiring means.

Based on the order of connection priority acquired by the order of priority acquiring unit 153, the transmission control unit 154 controls transmission of a connection request signal to the peripheral 200. Note that a detail transmission control performed by the transmission control unit 154 will be described later. Also, the transmission control unit 154 corresponds to transmission control means. According to transmission of a connection request signal performed by the transmission control unit 154, the data reception unit 155 receives measurement data transmitted from the peripheral 200. Note that the data reception unit 155 corresponds to data reception means.

Figure 7:
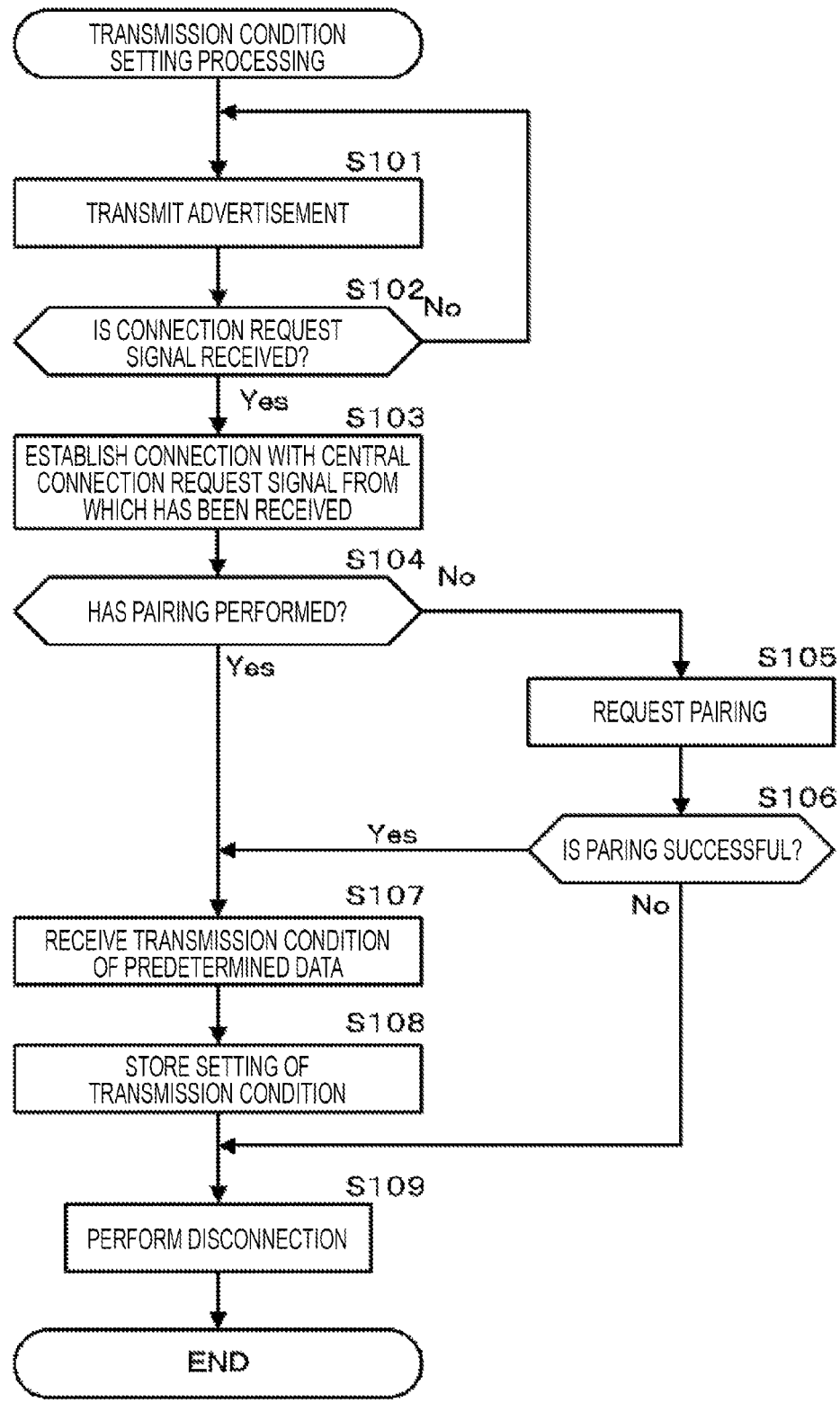
FIG. 7 is a view illustrating an example of a flowchart of transmission condition setting processing.

Here, transmission condition setting processing which is processing performed before the peripheral 200 transmits an advertisement including an order of connection priority will be described with reference to FIG. 7. When transmission conditions are received from a plurality of centrals 100, the transmission condition setting processing is started at arbitrary timing (such as timing at which power is turned on after peripheral 200 is installed in measurement place).

First, the transmission condition setting unit 251 of the peripheral 200 transmits an advertisement (step S101). Note that the advertisement is an advertisement transmitted before a transmission condition is set. Thus, the advertisement is different form an advertisement including an order of connection priority and transmitted after the transmission condition is satisfied. Also, the transmission condition setting unit 251 may transmit the advertisement including information indicating that a transmission condition can be received.

By the transmission of the advertisement, a plurality of centrals 100 in a distance communicable with the peripheral 200 realizes that the peripheral 200 is there and is capable of receiving a transmission condition.

Next, the peripheral 200 determines whether a connection request signal is received (step S102). More specifically, the peripheral 200 determines whether a connection request signal transmitted from any of the plurality of centrals 100 is received in response to transmission of an advertisement.

Here, when determining that a connection request signal is not received (step S102; No), the transmission condition setting unit 251 repeats transmission of the advertisement at certain intervals until a connection request signal is received. On the other hand, when determining that a connection request signal is received (step S102; Yes), the transmission condition setting unit 251 establishes connection with a central 100 the connection request signal from which is received (step S103).

Next, the transmission condition setting unit 251 determines whether pairing with the central 100 the connection request signal from which is received has been performed (step S104). Performing device registration of a central 100 to be paired with for reciprocal recognition is called the pairing.

Here, determining that the pairing has not been performed (step S104; No), the transmission condition setting unit 251 transmits a pairing request to the central 100 the connection request signal from which is received (step S105). Here, the transmission condition setting unit 251 requests information necessary for performing the device registration (such as address or device name of central 100).

When acquiring the necessary information by the pairing request and the pairing is performed successfully (step S106; Yes), the transmission condition setting unit 251 receives a transmission condition of predetermined data from the central 100 (step S107). On the other hand, when the pairing is not performed successfully (step S106; No), the transmission condition setting unit 251 is disconnected from the central 100 (step S109) and ends the processing.

On the other hand, when determining that the pairing has been performed (step S104; Yes), the transmission condition setting unit 251 receives a transmission condition of predetermined data from the central 100 (step S107). When receiving the transmission condition of the predetermined data, the transmission condition setting unit 251 sets and stores the transmission condition (step S108). Then, the transmission condition setting unit 251 is disconnected from the central 100 (step S109) and ends the processing.

By repeatedly performing the transmission condition setting processing, the peripheral 200 can set and store transmission conditions of the plurality of centrals 100. Here, a transmission condition set by the transmission condition setting processing is illustrated as an example in FIG. 8. FIG. 8 is a view illustrating an example of a transmission condition table.

In the transmission condition table, identification information (such as device name) for identification of a central 100, an address of the central, a transmission condition of predetermined data, and priority are associated with each other.

The priority is used to determine an order of connection priority in an advertisement transmitted after a transmission condition is satisfied. In an example of the present embodiment, the priority is an order in which the peripheral 200 receives transmission conditions. In a case of the example in FIG. 8, priority of the centrals 100a, 100b, and 100c are respectively "high", "middle", and "low". Thus, the following can be understood. That is, first, the central 100a transmits a connection request signal to the peripheral 200 and transmits, after the connection is established, a transmission condition. Then, the central 100b transmits a transmission condition, and then, the central 100c transmits a transmission condition.

Figure 9:
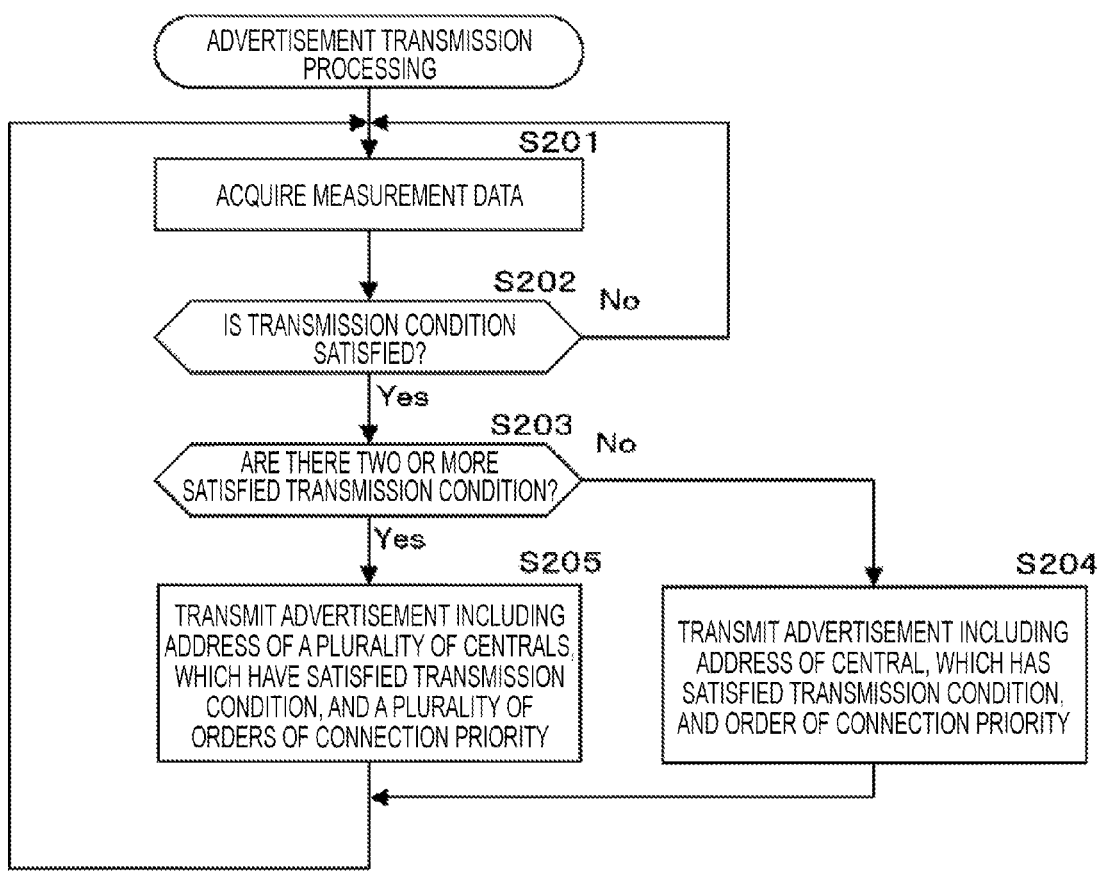
FIG. 9 is a view illustrating an example of a flowchart of advertisement transmission processing.

After setting and storing a transmission condition such as what is illustrated in the transmission condition table in FIG. 8 as an example and when the transmission condition is satisfied, the peripheral 200 starts transmitting an advertisement including an order of connection priority. In the following, detail description will be made with reference to FIG. 9. FIG. 9 is a view illustrating an example of a flowchart of the advertisement transmission processing performed after the setting and storing of the transmission condition. Note that in the following, an example in which three transmission conditions illustrated in the transmission condition table in FIG. 8 are set and stored will be described.

When a transmission condition is set and stored, the peripheral 200 starts the advertisement transmission processing. First, the control unit 202 of the peripheral 200 acquires measurement data at arbitrary timing (such as at predetermined time interval) (step S201). More specifically, the control unit 202 acquires, as measurement data, a temperature from the temperature sensor 230, humidity from the humidity sensor 240, and a WBGT value from the WBGT value calculation unit 250.

Next, the determination unit 252 determines whether the transmission condition is satisfied (step S202). More specifically, the determination unit 252 determines whether the acquired measurement data satisfies the transmission conditions illustrated in FIG. 8. Here, when the transmission conditions are not satisfied (step S202; No), processing goes back to acquisition of measurement data.

On the other hand, when it is determined that the transmission conditions are satisfied (step S202; Yes), the advertisement transmission unit 253 determines whether two or more transmission conditions are satisfied (step S203). When determining that there are not two or more satisfied transmission conditions (step S203; No), that is, when one transmission condition is satisfied, the advertisement transmission unit 253 transmits an advertisement including an address and an order of connection priority of a central 100 which satisfies the transmission condition (step S204). Also, when a connection request signal is received and connection is established, an address and an order of connection priority of the central 100 with which the connection is established are deleted.

Here, for example, when a temperature of 25° C. or higher which is a transmission condition is satisfied, the advertisement transmission unit 253 transmits an advertisement which is illustrated in a first example in FIG. 10 and includes an Address 100a which is an address of the central 100a and an order of connection priority indicating the first. Here, 0x00 (one byte) of the advertisement in the first example is a parameter indicating the order of connection priority. The lower the numeric value is, the higher the order of connection priority becomes. The parameter 0x00 indicates that the order of connection priority is the first.

Also, a configuration of AD Data (seven byte) in which a parameter (one byte) indicating an order of connection priority is added at a head of an address (six byte) is different from a configuration of the AD Data (six byte) which is based on the standard of the BLE illustrated in FIG. 3. Thus, as an AD Type, a type which is different from the Public Target Address and the Random Target Address and which indicates that an order of connection priority is included is specified. Thus, an address of the central 100 which address is included in the AD Data may be either of the Public Target Address and the Random Target Address. Note that a packet of the advertisement in which the AD Type and the AD Data according to the embodiment are used is different from the packet in FIG. 3 and is referred to as an extended advertisement.

Referring back to FIG. 9, when determining that two or more transmission conditions are satisfied (step S203; Yes), the advertisement transmission unit 253 transmits an advertisement including addresses of a plurality of centrals 100 which respectively satisfy the transmission conditions and a plurality of orders of connection priority (step S205). For example, a temperature of 25° C. or higher and a WBGT value of an alert or higher which are transmission conditions are satisfied simultaneously, the advertisement transmission unit 253 transmits an advertisement illustrated in a second example in FIG. 10. The advertisement includes Addresses 100a and 100b which are addresses of the centrals 100a and 100b and orders of connection priority respectively indicating the first and the second and determined according to priority. When three transmission conditions are satisfied simultaneously, the advertisement transmission unit 253 transmits an advertisement illustrated in a third example in FIG. 10.

After step S204 or S205, processing goes back to acquisition of measurement data (step S201) and processing in step S202 to step S205 is repeatedly performed. While the number of satisfied transmission conditions does not change, the same advertisement is transmitted. When the number of satisfied transmission conditions varies, an updated advertisement is transmitted.

In such a manner, when the transmission conditions are satisfied, the peripheral 200 transmits an advertisement including an order of connection priority determined based on an order of reception of the transmission conditions.

Figure 11:
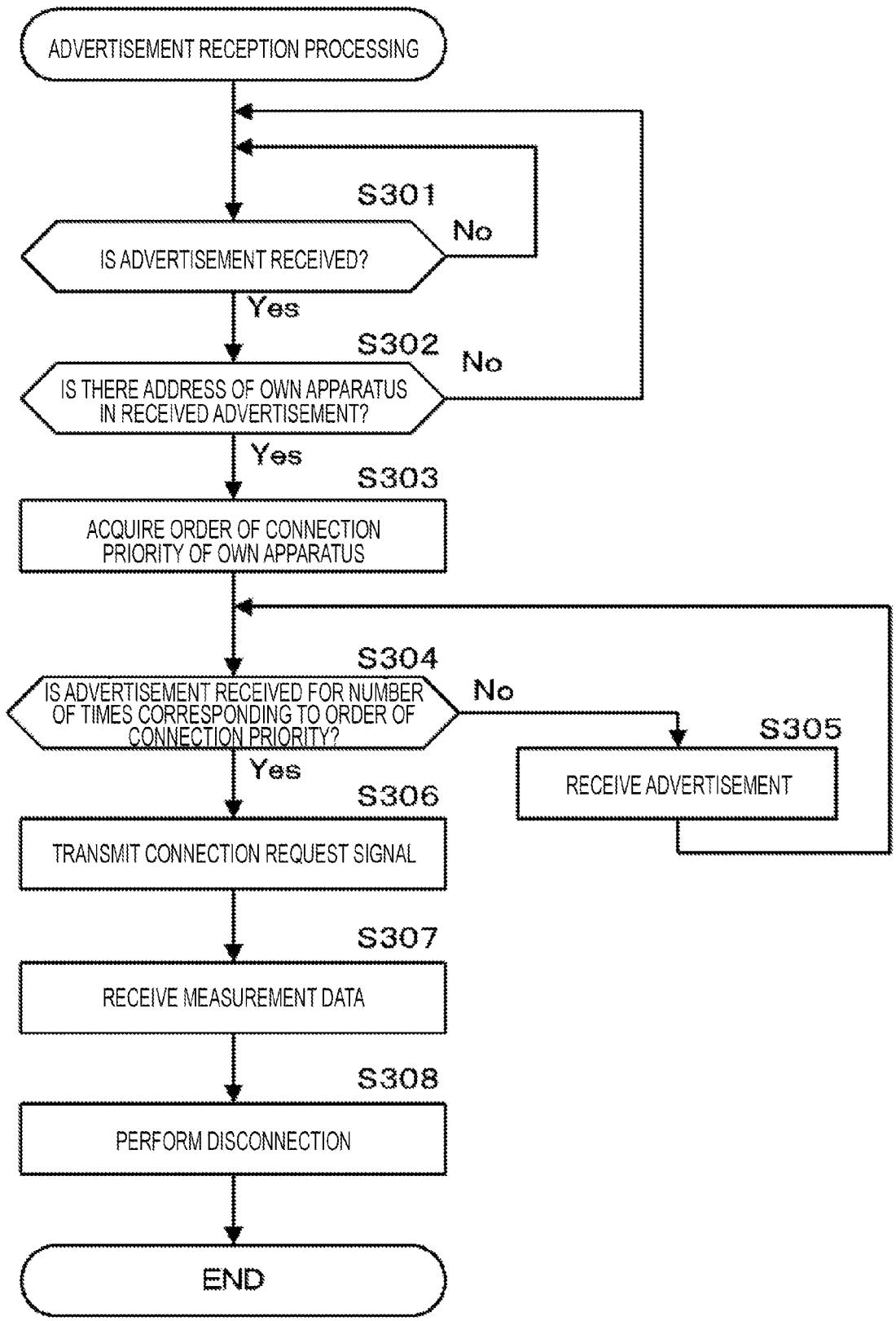
FIG. 11 is a view illustrating an example of a flowchart of advertisement reception processing.

Next, processing in the central 100 in a case of receiving the advertisement which includes an order of connection priority and which is transmitted by the advertisement transmission processing will be described with reference to FIG. 11. FIG. 11 is a view illustrating an example of a flowchart of the advertisement reception processing performed by the central 100. Note that it is assumed that the central 100 is in a distance communicable with the peripheral 200 and that there is a scanning instruction when performing the advertisement reception processing.

First, the advertisement reception unit 150 of the central 100 waits until an advertisement is received (step S301; No). When the advertisement reception unit 150 receives an advertisement (step S301; Yes), the address determination unit 152 determines whether there is an address of the own apparatus in the received advertisement (step S302).

Here, when the address determination unit 152 determines that there is not the address of the own apparatus in the received advertisement (step S302; No), processing in step S301 and S302 is repeatedly performed until an advertisement including the address of the own apparatus is received. On the other hand, when the address determination unit 152 determines that there is the address of the own apparatus in the received advertisement (step S302; Yes), the order of priority acquiring unit 153 acquires an order of connection priority of the own apparatus (step S303).

Next, the transmission control unit 154 determines whether an advertisement is received for the number of times corresponding to the order of connection priority (step S304). Here, for example, when the order of connection priority is the first, the number of times of receiving the advertisement is set as once. When the order of connection priority is the second, the number of times of receiving the advertisement is set as three times and when the order of connection priority is the third, the number of times of receiving the advertisement is set as five times.

Here, when the transmission control unit 154 determines that an advertisement is not received for the number of times corresponding to the order of connection priority (step S304; No), processing in step S304 and step in S305 is repeatedly performed until an advertisement is received (step S305) for the number of times corresponding to the order of connection priority. When it is determined that the advertisement is received for the number of times corresponding to the order of connection priority (step S304; Yes), the transmission control unit 154 transmits a connection request signal (step S306).

Here, for example, when the central 100a receives the advertisement illustrated in the third example, the order of connection priority is the first. Thus, it is necessary to receive the advertisement once. Thus, in step S304, the transmission control unit 154 of the central 100a determines that the advertisement is received for once, which is the number of times corresponding to the order of connection priority, and transmits a connection request signal.

On the other hand, for example, when the central 100c receives the advertisement illustrated in the third example, it is necessary to receive the advertisement for five times since the order of connection priority is the third. Thus, in step S304, the transmission control unit 154 of the central 100c determines that the advertisement is not received for five times, which is the number of times corresponding to the order of connection priority, and transmits a connection request signal after the advertisement is received for four more times.

Then, after the connection request signal is transmitted (step S306), connection with the peripheral 200 is established and measurement data is transmitted from the peripheral 200. The data reception unit 155 receives the measurement data from the peripheral 200 (step S307). Then, disconnection is performed (step S308) and processing ends.

Figure 12:
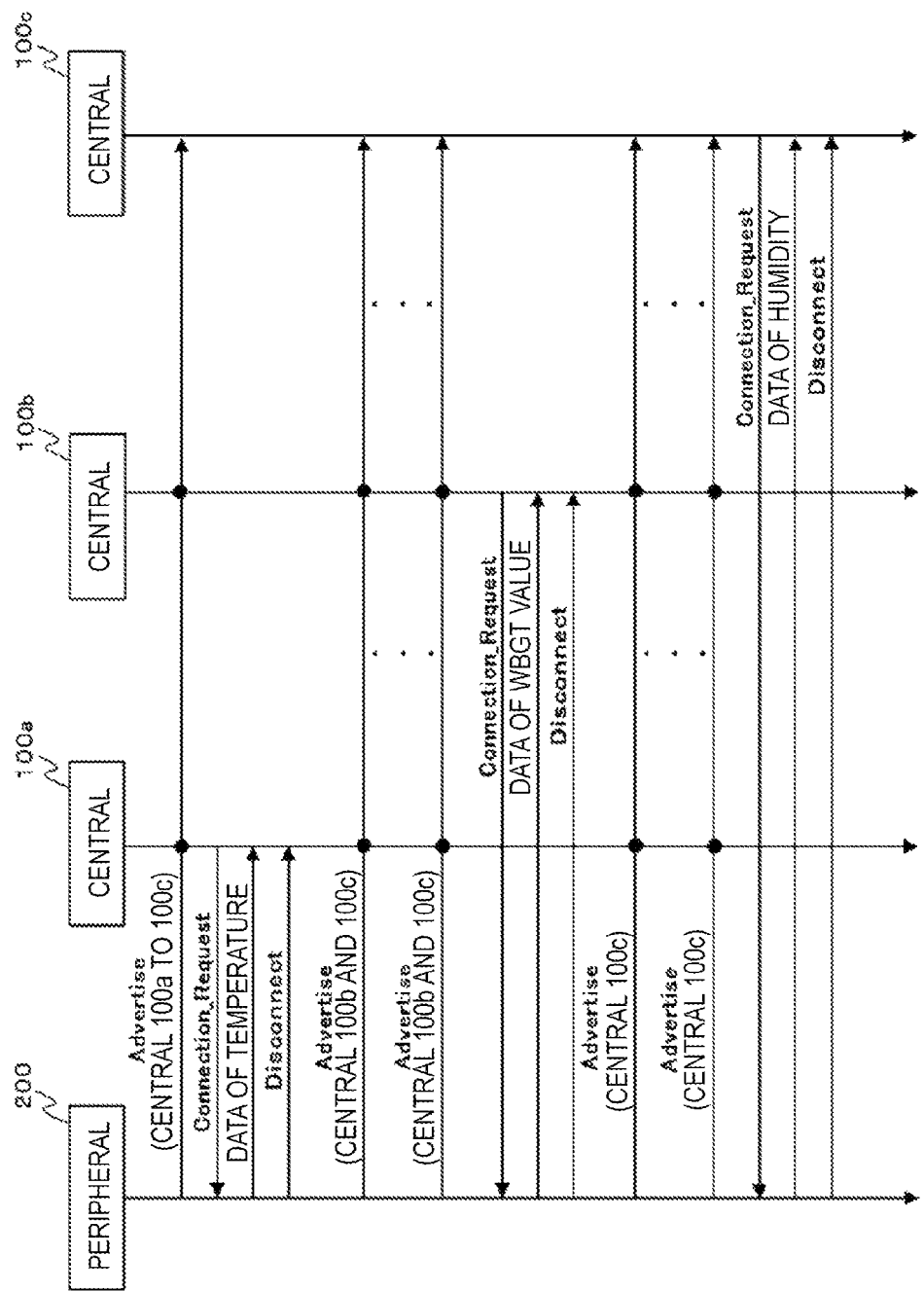
FIG. 12 is a view illustrating sequence according to the embodiment.

Detail examples of the advertisement transmission processing of the peripheral 200 and the advertisement reception processing of the central 100 which have been described with reference to FIG. 9 and FIG. 11 in the above will be described with reference to FIG. 12. FIG. 12 is a view illustrating sequence according to the present embodiment. Note that in FIG. 12, the following state is considered. That is, all of the three transmission conditions in the transmission condition table in FIG. 8 are satisfied and the peripheral 200 transmits the advertisement in the third example in FIG. 10. Also, the centrals 100a to 100c are in a distance communicable with the peripheral 200 and a scanning instruction is given.

In FIG. 12, first, the peripheral 200 transmits an advertisement to each of the central 100a, the central 100b, and the central 100c. When the central 100a which is the first in the order of connection priority receives the advertisement once, transmission/reception of data of a temperature to/from the peripheral 200 is performed. Next, the peripheral 200 transmits the advertisement to each of the central 100b and the central 100c. When the central 100b which is the second in the order of connection priority receives the advertisement for three times, transmission/reception of data of a WBGT value to/from the peripheral 200 is performed. Then, the peripheral 200 transmits the advertisement to the central 100c. When the central 100c which is the third in the order of connection priority receives the advertisement for five times, transmission/reception of data of humidity to/from the peripheral 200 is performed.

As described above, according to the present embodiment, when a transmission condition is satisfied, the peripheral 200 transmits an advertisement including an order of connection priority of when the central 100 is connected to the own apparatus. Thus, when there is an order of priority in the centrals 100 to be connection objects, it is possible to receive connection request signals in the order of priority.

Also, after receiving an advertisement for the number of times corresponding to the order of connection priority of the own apparatus, the central 100 transmits a connection request signal. Accordingly, it is possible to prevent interference of connection request signals since the connection request signals are not transmitted simultaneously from a plurality of specific centrals 100.

Also, compared with a method of performing transmission for the predetermined number of times individually in an order of priority, in the present embodiment, even when an order of priority is low, an advertisement is transmitted as the first in the order of connection priority while only one transmission condition is satisfied. Thus, it is possible to reduce a waiting time of a central.

In such a manner, according to the peripheral 200 and the central 100 of the present embodiment, radio communication is performed based on an order of connection priority. Thus, it is possible to perform radio communication efficiently while preventing interference.

The above is the description of the present embodiment. However, the above embodiment is an example and detail configurations and contents of processing in the peripheral 200 and the central 100 are not necessarily limited to what has been described in the above embodiment.

(Modification)

In the above embodiment, priority for determination of an order of connection priority is an order in which a transmission condition is received from the peripheral 200 but the above is not the limitation. For example, the priority may be what corresponds to a type of predetermined data. More specifically, it is considered to set the priority in the following manner: a WBGT value>temperature>humidity. FIG. 13 is a view illustrating a different example of a transmission condition table acquired when the transmission condition setting processing in FIG. 7 is performed by a peripheral 200 based on the priority. Note that in the transmission condition setting processing, it is assumed that transmission conditions are received from a central 100d in addition to centrals 100a to 100c.

As illustrated in FIG. 13, priority in the centrals 100a to 100d is based on this relationship: a WBGT value>a temperature>humidity. In this case, since transmission conditions of both of the centrals 100a and 100d relate to temperature, priority thereof is identical. FIG. 14 is a view illustrating a different example of an advertisement transmitted by the peripheral 200 in advertisement transmission processing performed based on the transmission condition table in FIG. 13.

A first different example illustrates an advertisement transmitted when only a transmission condition of the central 100a is satisfied. A second different example illustrates an advertisement transmitted when transmission conditions of the centrals 100a and 100b are satisfied. A third different example illustrates an advertisement transmitted when transmission conditions of the centrals 100a to 100c are satisfied. A fourth different example is an advertisement transmitted when transmission conditions of the centrals 100a to 100d are satisfied. In the fourth different example, priority of the centrals 100a and 100d is "middle", and thus, orders of connection priority thereof are the second.

According to the advertisement reception processing in FIG. 11, the central 100 receives an advertisement. Here, when the central 100 receives an advertisement including an identical order of connection priority illustrated in the fourth different example, for example, the number of times of receiving an advertisement is determined by using a pseudo-random number. More specifically, when the central 100d receives an advertisement illustrated in the fourth different example, the second which is an order of connection priority identical to that of the own apparatus is included in the order of priority. In this case, based on the pseudo-random number, the central 100d determines one number of times of reception among three to six times of reception. After receiving an advertisement for the determined number of times, the central 100d transmits a connection request signal.

Figure 15:
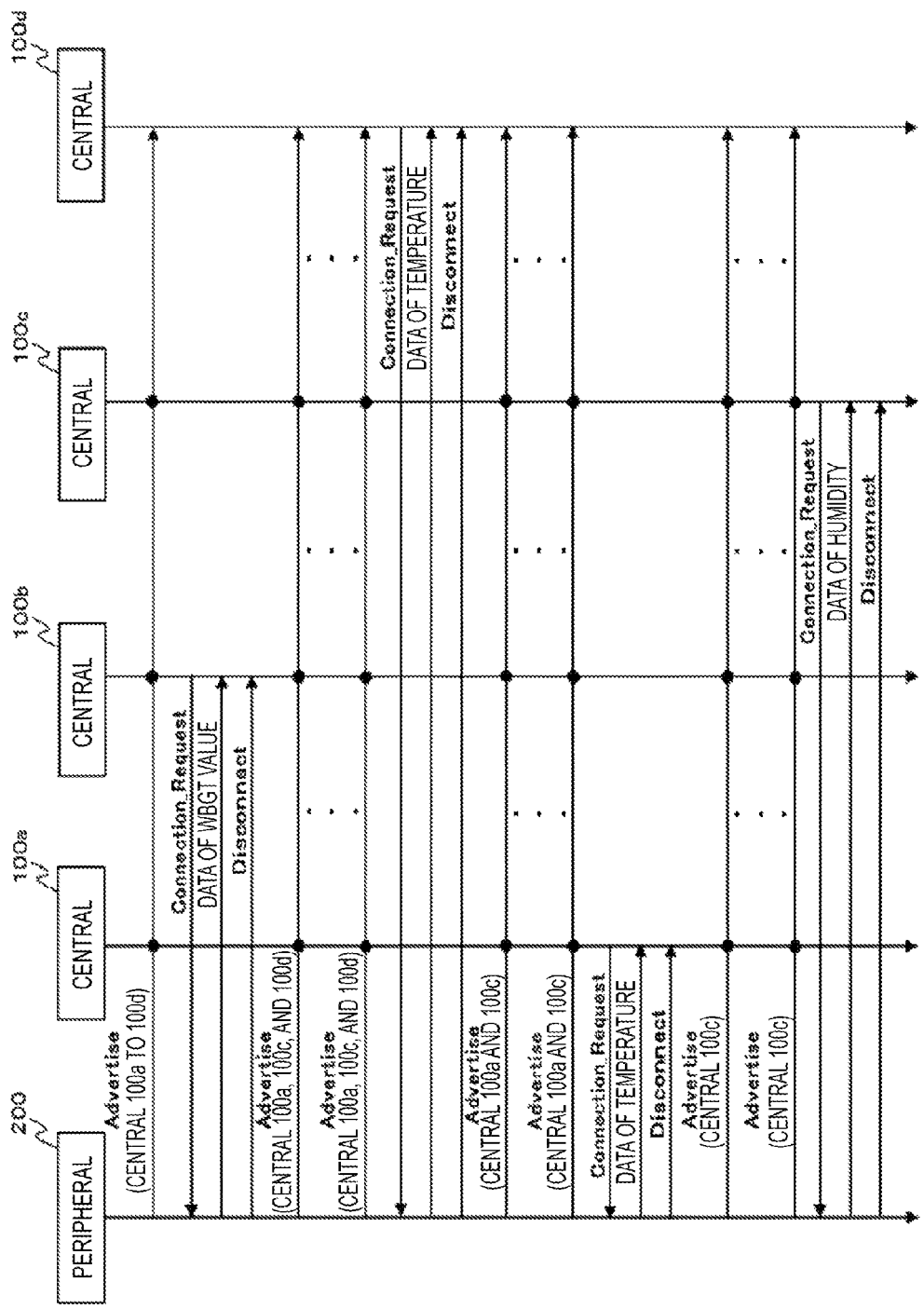
FIG. 15 is a view illustrating a sequence according to a modification.

FIG. 15 is a sequence diagram according to the modification. In FIG. 15, the following case is assumed. That is, all four transmission conditions in the transmission condition table in FIG. 13 are satisfied and the peripheral 200 transmits the advertisement in the fourth different example in FIG. 14. Also, the centrals 100a to 100d are in a distance communicable with the peripheral 200 and a scanning instruction is given. Also, the number of times of receiving an advertisement of the centrals 100d and 100a, which are the second in the order of connection priority and are in the identical order, is determined by the pseudo-random number and is three times and four times, respectively.

In FIG. 15, first, the peripheral 200 transmits an advertisement to each of the central 100a, the central 100b, the central 100c, and the central 100d. When the central 100b which is the first in the order of connection priority receives an advertisement once, transmission/reception of data of a WBGT value to/from the peripheral 200 is performed. Next, the peripheral 200 transmits the advertisement to the central 100a, the central 100c, and the central 100d. When the central 100d which is the second in the order of connection priority receives the advertisement for three times which is the number of times determined by the pseudo-random number, transmission/reception of data of a temperature to/from the peripheral 200 is performed.

Next, the peripheral 200 transmits the advertisement to the central 100a and the central 100c. When the central 100a which is the second in the order of connection priority receives the advertisement for four times which is the number of times determined by the pseudo-random number, transmission/reception of data of a temperature to/from the peripheral 200 is performed. Next, the peripheral 200 transmits the advertisement to the central 100c. When the central 100b which is the third in the order of connection priority receives the advertisement for five times, transmission/reception of data of humidity to/from the peripheral 200 is performed.

As described, according to the modification, the peripheral 200 determines an order of connection priority based on a type of predetermined data. Thus, an order of connection priority can be determined according to importance of data.

Also, according to the modification, when there is an order of priority identical to that of the own apparatus in an order of connection priority, the central 100 determines the number of times of receiving an advertisement based on the pseudo-random number. After the advertisement is received for the determined number of times, a connection request signal is transmitted. Thus, even when an advertisement transmitted by the peripheral 200 includes an identical order of connection priority, connection request signals can be transmitted in different number of times of reception. Thus, interference of connection request signals can be prevented.

Also, in the above-described embodiment, a connection request signal is transmitted after reception for the number of times corresponding to the order of priority is performed but the above is not the limitation. A connection request can be controlled, for example, in a time such as a waiting time corresponding to an order of priority.

Also, in the above-described embodiment, a parameter indicating an order of connection priority is added before an address of the central 100 by using an extended advertisement but the above is not the limitation. That is, any method may be used as long as an order of connection priority can be indicated by using an advertisement. For example, when the advertisement in FIG. 3 is used without usage of the extended advertisement, an order of connection priority may be indicated by an alignment order of addresses of a plurality of centrals 100 which addresses are included in the AD Data without usage of a parameter indicating the order of connection priority. Also, an AD Type may be provided for each order of connection priority and may be used selectively.

Also, in the advertisement transmission processing of the above-described embodiment, a state in which three transmission conditions in the transmission condition table are set and stored has been described as an example but is not the limitation. The advertisement transmission processing can be performed as long as one or more transmission conditions are set and stored. For example, the advertisement transmission processing may be started after one transmission condition is set and stored by the transmission condition setting processing. In this case, when a new transmission condition is increased, it is determined whether a plurality of transmission conditions is satisfied in the advertisement transmission processing.

Also, the central 100 and the peripheral 200 according to an embodiment of the present invention can be realized not only by using a special apparatus but also by a general computer system. For example, by execution of a program by a computer, a function of the central 100 and a function of the peripheral 200 may be realized. A program for realizing the function of the central 100 and the function of the peripheral 200 may be stored in a computer-readable recording medium such as a universal serial bus (USB) memory, a compact disc read only memory (CD-ROM), a digital video disc (DVD), or a hard disk drive (HDD) or may be downloaded into the computer through a network.

In the above, a preferred embodiment of the present invention has been described. However, the present invention is not limited to the specific embodiment. The present invention includes the invention described in claims and an equivalent thereof.

What is claimed is:

1. A radio communication apparatus comprising:
a control unit configured to:
receive announcement information including an order of connection priority of when connection to a different radio communication apparatus is performed;
acquire the order of connection priority included in the announcement information; and
control transmission of a connection request signal to the different radio communication apparatus based on the order of connection priority,
wherein the control unit transmits the connection request signal after receiving the announcement information for the number of times corresponding to an order of priority of an own apparatus which order is indicated by the order of connection priority.

2. The radio communication apparatus according to claim 1, wherein when there is an order of priority identical to that of an own apparatus in an order of priority indicated by the order of connection priority, the control unit determines the number of times of receiving the announcement information based on a pseudo-random number and transmits the connection request signal after receiving the announcement information for the determined number of times.

3. The radio communication apparatus according to claim 1, further comprising a communication unit which transmits a transmission condition of predetermined data to the different radio communication apparatus and receives the predetermined data transmitted from the different radio communication apparatus in response to the transmission of the connection request signal.

4. A non-volatile computer-readable medium causing a computer to execute
announcement information reception processing to receive announcement information including an order of connection priority of when connection to a different radio communication apparatus is performed,
acquiring processing to acquire the order of connection priority included in the announcement information acquired by the announcement information reception processing,
transmission control processing to control transmission of a connection request signal to the different radio communication apparatus based on the order of connection priority acquired by the acquiring processing, and
a transmission instruction to a control unit to transmit the connection request signal after receiving the announcement information for a number of times corresponding to an order of priority of an own apparatus which order is indicated by the order of connection priority.

5. A central configured to perform radio communication with a peripheral, comprising:

a communication unit configured to receive an advertisement including an order of connection priority of when connection to the peripheral is performed; and a control unit configured to acquire the order of connection priority included in the advertisement and to control transmission of a connection request signal to the peripheral based on the order of connection priority, wherein the control unit transmits the connection request signal after receiving the announcement information for the number of times corresponding to an order of priority of an own apparatus which order is indicated by the order of connection priority.

* * * * *